United States Patent

Ishikawa

[11] Patent Number: 5,946,028
[45] Date of Patent: Aug. 31, 1999

[54] APPARATUS AND METHOD FOR CONTROLLING MAGNIFICATION OF IMAGE IN CAMERA

[75] Inventor: Tuyoshi Ishikawa, Tokyo, Japan

[73] Assignee: Asahi Kogaku Kogyo Kabushiki Kaisha, Tokyo, Japan

[21] Appl. No.: 08/661,633

[22] Filed: Jun. 11, 1996

[30] Foreign Application Priority Data

Jun. 12, 1995 [JP] Japan ................................ 7-144374

[51] Int. Cl.$^6$ ................................................ H04N 5/225
[52] U.S. Cl. ........................... 348/64; 348/335; 348/358
[58] Field of Search ............................ 348/64, 65, 345, 348/358, 341, 351, 347, 348, 349, 350, 335, 340; 250/201.2

[56] References Cited

U.S. PATENT DOCUMENTS

| 4,276,471 | 6/1981 | Utagawa | 250/201 |
| 4,420,248 | 12/1983 | Ogawa et al. | |
| 4,474,462 | 10/1984 | Ogawa et al. | |
| 4,498,759 | 2/1985 | Ogawa et al. | |
| 4,618,253 | 10/1986 | Arai | |
| 5,101,278 | 3/1992 | Itsumi et al. | 348/349 |
| 5,341,190 | 8/1994 | Ogawa | |
| 5,416,519 | 5/1995 | Ohtake | 348/351 |
| 5,424,772 | 6/1995 | Aoki et al. | |
| 5,710,954 | 1/1998 | Inoue | 348/333 |

*Primary Examiner*—Wendy Garber
*Attorney, Agent, or Firm*—Greenblum & Bernstein, P.L.C.

[57] ABSTRACT

An apparatus for controlling a magnification of an image in a camera includes a first image forming lens which forms an image of an object, an image re-forming lens which re-forms the image formed by the first image forming lens on an image pick-up surface, and a device for moving the image re-forming lens and the image pick-up surface independently along an optical axis of the image re-forming lens.

15 Claims, 5 Drawing Sheets

APPARATUS AND METHOD FOR CONTROLLING MAGNIFICATION OF IMAGE IN CAMERA

BACKGROUND OF THE INVENTION

1. Field of the Invention

The present invention relates to an apparatus and method for controlling the magnification of an image in a camera.

2. Description of the Related Art

A converter lens or zoom lens has been widely used in a camera to optically vary the size of an image of an object to be photographed by the camera. In recent video cameras or the like, the object image picked-up by an image pickup device, i.e., a CCD (charged coupled device), is positioned on an image forming surface to be electronically processed to control the size of the image.

In the prior art, if the image picked-up by the CCD is electrically enlarged, the information density per unit surface area is reduced. Hence, the degree of enlargement of the image is limited to the extent that a good resolution can be obtained.

When a converter lens or zoom lens is used to increase the size of the image, a high resolution can be obtained even for an enlarged image, however this complicates the structure of the optical system.

SUMMARY OF THE INVENTION

It is an object of the present invention to provide an apparatus and method for controlling the image magnification in a camera, in which a high resolution can be obtained, even for an large image by use of a simple optical arrangement.

To achieve the object mentioned above, according to an aspect of the present invention, there is provided an apparatus for controlling a magnification of an image in a camera including a first image forming lens and an image re-forming lens, so that an image of an object formed by the first image forming lens can be re-formed on an image pick-up surface by the image re-forming lens. Means are provided for moving the image re-forming lens and the image pick-up surface independently along an optical axis of the image re-forming lens.

Preferably, means are also are provided for moving the image pick-up surface to an in-focus position of the image re-forming lens.

According to an embodiment of the present invention, the camera is a compound camera which is provided with an image forming surface located at an in-focus position of the first image forming lens. Light reflecting means are provided between the image forming surface and the first image forming lens. The image re-forming lens is positioned in the optical path of light reflected by the light reflecting means. The compound camera also includes an image pick-up surface located at an in-focus position of the image re-forming lens. The image pick-up surface is preferably in the form of a CCD.

Preferably, the image forming surface is a silver halide film.

According to still another embodiment of the present invention, the image re-forming lens and the image pick-up surface are capable of moving together in a direction perpendicular to the optical axis of the image re-forming lens.

In another embodiment of the present invention, an optical element is provided between the image re-forming lens and the image forming surface to deflect light at a variable deflection angle. The deflection angle of the light deflected by the optical element is varied such that a change in position of an image formed by the deflected light is within a depth of focus of the image re-forming lens.

In another aspect of the present invention, there a method is provided for controlling a magnification of an image in a camera consisting of a first image forming lens which forms an image of an object, and an image re-forming lens which re-forms the image formed by the first image forming lens on an image pick-up surface. The method includes the steps of firstly, moving the image re-forming lens in an optical axis direction thereof, and secondly moving the image pick-up surface in the optical axis direction of the image re-forming lens, so that the image pick-up surface is located in an in-focus position of the image re-forming lens.

Preferably, a third step of moving the image re-forming lens and the image pick-up surface in a direction perpendicular to the optical axis of the image re-forming lens is included.

The camera is preferably a compound camera including an image forming surface located at an in-focus position of the first image forming lens, and light reflecting means provided between the image forming surface and the first image forming lens. The image re-forming lens is positioned in an optical path of light reflected by the light reflecting means. The compound camera also includes an image pick-up surface located at an in-focus position of the image re-forming lens. The image pick-up surface is preferably a CCD.

Preferably, the image forming surface is a silver halide film.

With the above-mentioned arrangement, since the image re-forming lens and the image pick-up surface are movable along the optical axis of the image re-forming lens, and the image pick-up surface is located at an in-focus position in accordance with the position of the image re-forming lens, a focused image, having a size corresponding to the position of the image re-forming lens, can be formed on the image pick-up surface. Thus, the image magnification can be optically controlled.

The present disclosure relates to subject matter contained in Japanese Patent Application No. 7-144374 (filed on June 12, 1995) which is expressly incorporated herein by reference in its entirety.

BRIEF DESCRIPTION OF THE DRAWINGS

The present invention will be described below in detail with reference to the accompanying drawings in which like parts are indicated by similar reference numerals, and wherein.

DESCRIPTION OF THE PREFERRED EMBODIMENTS

The following embodiments of the present invention are applied to a monitoring compound camera having a monitoring function accomplished through a TV camera, and a photographing function to take a picture according to need.

Figure 1:
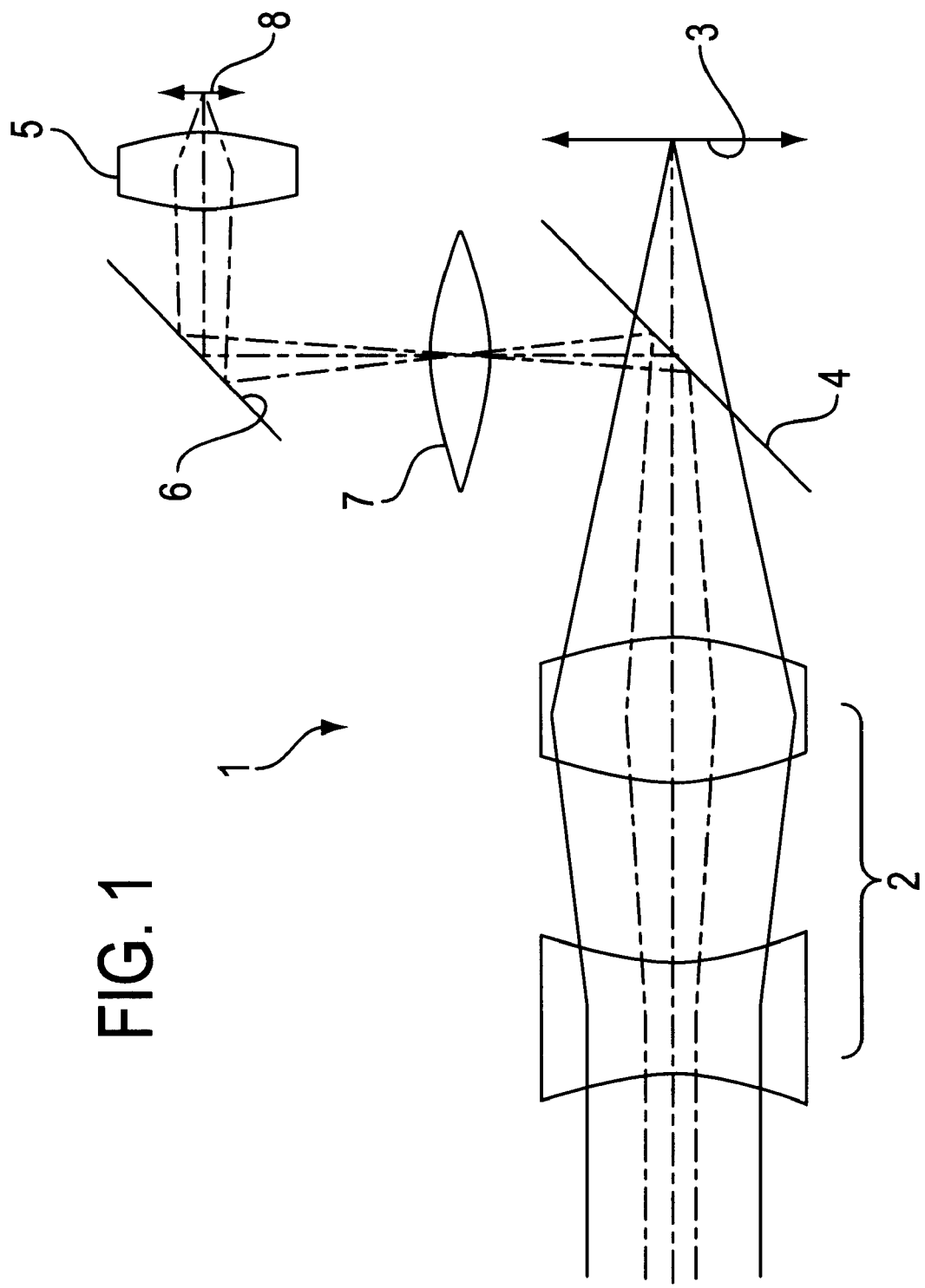
FIG. 1 is a schematic view of an entire optical system of a compound camera, according to an aspect of the present invention.

FIG. 1 shows an optical system 1 of a compound camera (referred to hereinafter as a camera). The optical system 1 is provided with a first image forming lens 2 which constitutes a photographing lens system, and an image forming surface (film surface) 3 on which an object image is formed by the first image forming lens 2. Note that the first image forming lens 2 comprises of one or more lens elements, although in the specification it is referred to as a lens.

A mirror 4 is provided between the first image forming lens 2 and the image forming surface 3 at an inclination angle of approximately 45° with respect to an optical axis of the first image forming lens 2. The mirror 4 is provided with a slit (not shown) and functions as a shutter. Namely, in a monitoring mode (normal mode) in which no image recording (photographing) is required, all light transmitted through the first image forming lens 2 is reflected by the mirror 4 toward an image re-forming lens 5 (note that although in FIG. 1 only a single lens is illustrated, the image re-forming lens 5 comprises one or more lenses). While in a recording mode, in which a picture of the object is recorded (photographed), the slit of the mirror 4 moves in front of the image forming surface 3, similar to a slit in a focal plane shutter, so that light is transmitted through the slit of the mirror 4 to be made incident upon the image forming surface 3 to record the image. In the present embodiment, the image forming surface 3 is made of a silver halide film surface on which the image is formed. The image formed on the image forming surface 3 is used for photographing purposes.

The mirror 4 can be replaced by a half mirror or a quick-return mirror. In the case of a half mirror or a quick-return mirror being used, a focal plane shutter is provided in front of the image forming surface 3. Alternatively, it is also possible to use a beam splitter in place of the mirror 4.

The light reflected by the mirror 4 is subsequently reflected by a stationary mirror 6 before reaching the image re-forming lens 5 which constitutes a relay lens system. The stationary mirror 6 is opposed to the mirror 4 and is inclined at 45° with respect to the path of light reflected therefrom. A condenser lens 7 is positioned in the path of light reflected by the mirror 4, i.e., the condenser lens 7 is positioned between the mirror 4 and the stationary mirror 6. The condenser lens 7 is located at a position optically equivalent to the first image forming surface 3 with respect to the first image forming lens 2. Namely, the condenser lens 7 defines an image forming surface on which the image is formed by the first image forming lens 2, similar to the image forming surface (film surface) 3.

The light incident upon the image re-forming lens 5 is converged onto an image pick-up surface 8 by the image re-forming lens 5. The image pick-up surface 8 comprises of a CCD, so that the image formed on the image pick-up surface 8 can be used for monitoring purposes.

The image re-forming lens 5 and the image pick-up surface 8 are independently movable along the optical axis of the image re-forming lens 5, i.e., along the path of light reflected by the stationary mirror 6. The size of the image formed on the image pick-up surface 8 by the image re-forming lens 5 is adjusted by moving the image re-forming lens 5 along the optical axis thereof, so that the image pick-up surface 8 is located in an in-focus position, i.e., a position at which a focused image can be formed on the image forming surface 8.

Figure 2:
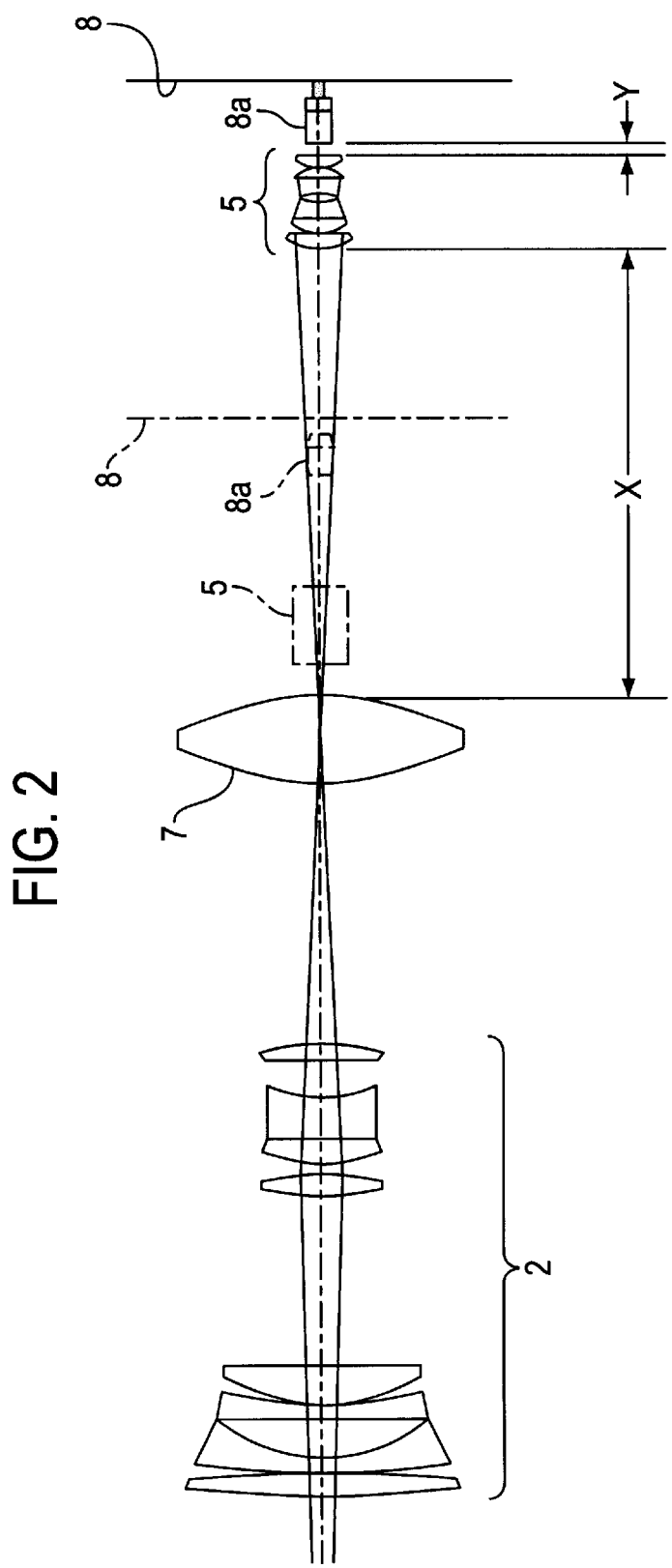
FIG. 2 is an explanatory view of an optical system.

FIG. 2 shows an explanatory view of an optical system (note that the mirror 4 and the stationary mirror 6 are omitted) in which light transmitted through the first image forming lens 2 reaches the image pick-up surface 8 after passing through the optical elements, such as the condenser lens 7, etc. In FIG. 2 the optical elements are aligned, and there are no additional elements provided to adjust the image magnification.

Note that in FIGS. 2, 8a designates an infrared filter portion formed integral with the CCD which constitutes the image pick-up surface 8.

Figure 3:
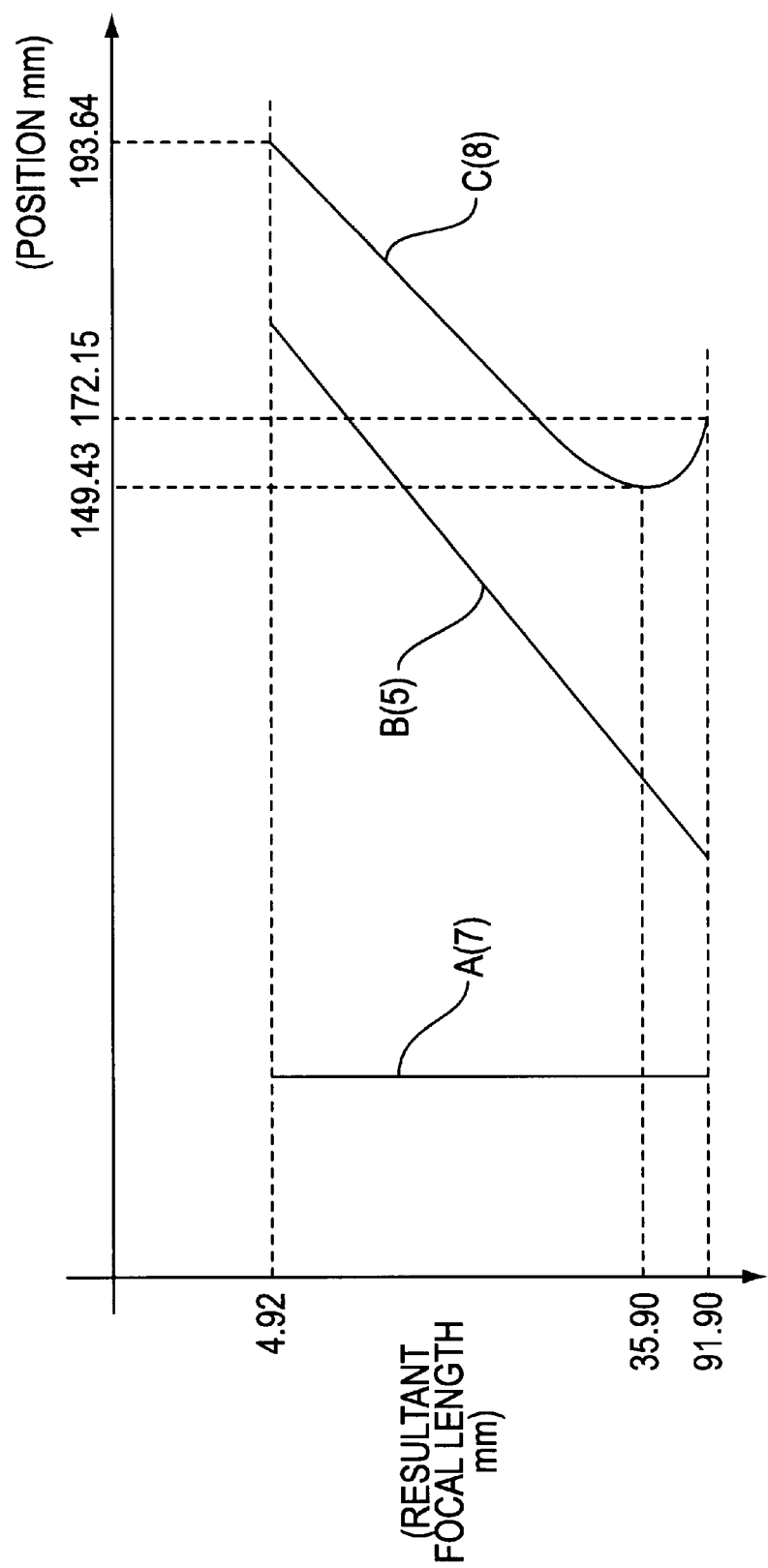
FIG. 3 is a diagram showing a relationship between the positions of an image re-forming lens and an image pick-up surface and a resultant focal length.

FIG. 3 shows a locus "C" of the movement of the in-focus position of the image formed by the image re-forming lens 5. "C" is determined by moving the image re-forming lens 5 in the optical axis direction along a locus "B". When the image pick-up surface 8 is moved along the locus "C", the image formed on the image forming surface 7 can always be re-formed in a focused state on the image pick-up surface 8. Namely, the image is correctly formed by the first image forming lens 2 on the image forming surface 7, and the image is then re-formed in a focused state on the image pick-up surface 8. The size of the image formed on the image pick-up surface 8 varies depending on the position of the image re-forming lens 5. Note that the position of the image forming surface (condenser lens) 7, indicated by the line "A" in FIG. 3, does not change.

Figure 4:
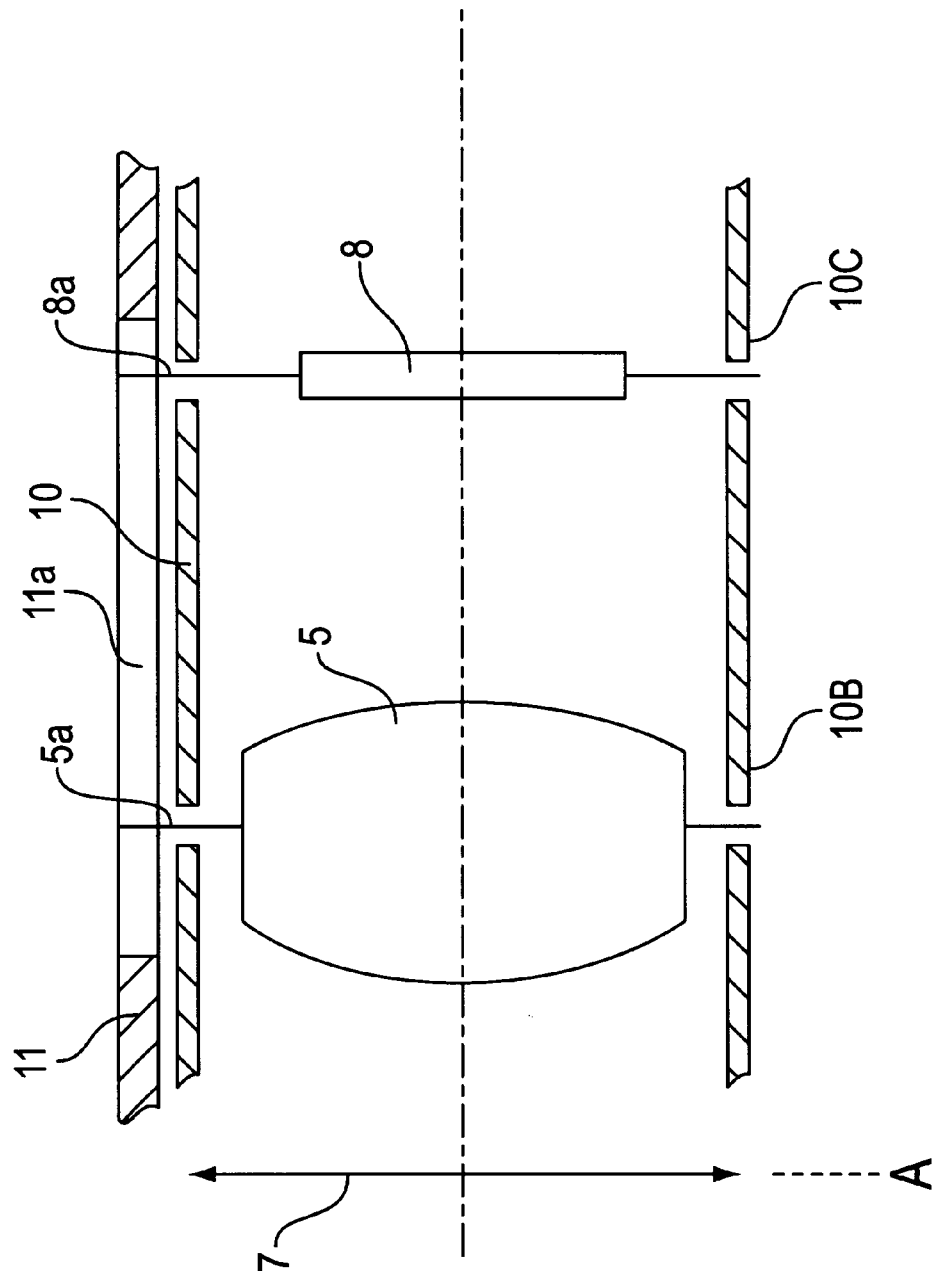
FIG. 4 is a conceptual view of a moving mechanism for moving an image re-forming lens and an image pick-up surface (CCD) by way of example.

FIG. 4 shows a conceptual view of a moving mechanism for respectively moving the image re-forming lens 5 and the image pick-up surface (CCD) 8 along the loci "B" and "C". A rotatable cam ring 10 is provided with cam grooves 10B and 10C corresponding to the loci "B" and "C", respectively. The image re-forming lens 5 and the CCD 8 are respectively provided with cam pins 5a and 8a which are respectively fitted in the cam grooves 10B and 10C. The cam pins 5a and 8a are also fitted in a linear movement guide groove 11a which is formed on a linear movement guide member 11. The linear movement guide groove 11a extends in parallel to the optical axis of the image re-forming lens 5, so that a rotation of the cam ring 10 causes the image re-forming lens 5 and the CCD 8 to move along the respective loci shown in FIG. 3.

Numerical examples of the position of the image re-forming lens 5 and the position of the CCD 8, and the resultant focal length of the first image forming lens 2, the condenser lens 7 and the image re-forming lens 5 will be discussed below.

In these examples, it is assumed that the focal lengths of the first image forming lens 2 and the image re-forming lens 5 are fixed at 23 mm and 13.2 mm, respectively.

If the maximum distance X between the image re-forming lens 5 (indicated by solid lines in FIG. 2) and the condenser lens 7 is 65.8 mm, the resultant focal length is 4.92 mm. In this case, if the distance Y between the surface of the image re-forming lens 5 adjacent to the image pick-up surface and the surface of the CCD (image pick-up surface 8) on the object side, i.e., the surface of the infrared filter portion 8a, is 1.154 mm, the image pick-up surface 8 is located at an in-focus position in which a focused image can be formed on the image pick-up surface 8.

If the image re-forming lens 5 is moved along the optical axis so that the distance X between the image re-forming lens 5 and the condenser lens 7 is 55.8 mm, the resultant focal length is 5.74 mm. In this case, if the distance Y between the surface of the image re-forming lens 5 adjacent to the image pick-up surface, and the surface of the CCD on the object side is 1.574 mm, the image pick-up surface 8 is located at the in-focus position. In this example, the image formed on the image pick-up surface 8 is larger than that in the first example. Thus, the center portion of the image formed by the first image forming lens 2 is enlarged.

If the image re-forming lens 5 is moved along the optical axis so that the distance X between the image re-forming lens 5 and the condenser lens 7 is 5.8 mm, as indicated by the phantom line in FIG. 2, the resultant focal length is 35.90 mm. In this case, if the distance Y between the surface of the image re-forming lens 5 adjacent to the image pick-up surface and the surface of the CCD 8 on the object side is 16.934 mm, the image pick-up surface 8 is located at the in-focus position. Hence, a larger focused image can be obtained.

If the image re-forming lens 5 is moved along the optical axis to a position in which the image re-forming lens 5 is in contact with the condenser lens 7, i.e., the distance X between the image re-forming lens 5 and the condenser lens 7 is 0, the resultant focal length is in theory 91.90 mm. In this case, if the distance Y between the surface of the image re-forming lens 5 adjacent to the image pick-up surface and the surface of the CCD on the object side is 45.459 mm, the image pick-up surface 8 is located at the in-focus position. Hence, in theory, a larger focused image can be obtained in this example.

In practice, however, in the embodiment shown in FIG. 1, since the image re-forming lens 5 interferes with the stationary mirror 6 when the distance X between the image re-forming lens 5 and the condenser lens 7 is 0, no focused image can be obtained. However, in an optical system in which no stationary mirror 6 is employed, a focused state can be established.

As can be seen from the foregoing, the adjustment of the size of the image in accordance with the control of the resultant focal length can be carried out by appropriately selecting the distance X, between the image re-forming lens 5 and the condenser lens 7, and the distance Y, between the surface of the image re-forming lens 5 adjacent to the image pick-up surface and the surface of the CCD 8 on the object side.

Note that "position" represented by the abscissa in FIG. 3 refers to the distance from the surface of the first image forming lens 2 that is located on the object side.

To move the image re-forming lens 5 and the image pick-up surface 8 while keeping the positional relationship shown in FIG. 3, it is possible to provide motors which independently move the image re-forming lens 5 and the image pick-up surface 8, the positional relation therebetween being controlled by a computer, in place of the moving mechanism shown in FIG. 4.

Thus, since the resultant focal length can be continuously controlled, the image magnification can be optically controlled without attenuating the resolution, unlike in the prior art in which the image is magnified by an electrical process, thus leading to a reduced resolution. Moreover, since no additional optical element is needed to adjust the image magnification, the optical system is simplified.

In particular, in the present embodiment, the image pick-up surface 8 comprising of the CCD, can be moved by a relatively simple mechanical structure in comparison with the arrangement in which a photographing film is used, thus resulting in a simplification of the camera structure.

Furthermore, since the image magnification in a compound camera is controlled by the image re-forming lens 5 and the image pick-up surface 8, the adjustment of the image magnification has no influence on the image forming surface 3 and thus a complex optical system is not required for the compound camera.

In the above-mentioned embodiment, the image re-forming lens 5 and the image pick-up surface 8 are moved along the optical axis. However, the direction of the movement is not limited thereto. For example, as may be seen in FIG. 5, it is possible to move the image re-forming lens 5 and the image pick-up surface 8 not only in the optical axis direction O1, but also in a direction perpendicular thereto, as indicated by the arrows.

Figure 5:
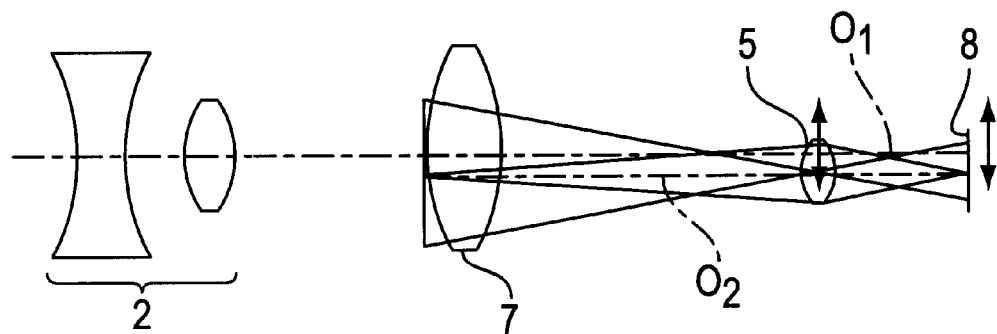
FIG. 5 is a schematic view of main elements in another embodiment of an optical system according to the present invention; and, FIG. 6 is a schematic view of main elements in still another embodiment of an optical system according to the present invention.

In FIG. 5, the image re-forming lens 5 and the image pick-up surface 8 move in parallel in the same direction, so that the optical axis O2 passing through the center of the image re-forming lens 5, displaced in the direction perpendicular to the optical axis O1, and the center of the image pick-up surface 8, displaced in the same direction, is parallel with the optical axis O1 of the condenser lens 7.

Consequently, any portion of the image formed by the first image forming lens 2, other than the portions located in the vicinity of the optical axis O1 can be converged by the image re-forming lens 5 onto the image pick-up surface 8, in accordance with the amount of displacement of the optical axis O2 and the direction of the displacement with respect to the optical axis O1. Moreover, the image can be reduced or enlarged in accordance with the axial position of the image re-forming lens 5 and the image pick-up surface 8 in the direction of the optical axis O2. It is also possible to move only the image pick-up surface 8 in the direction perpendicular to the optical axis O1, without moving the image re-forming lens 5.

Figure 6:
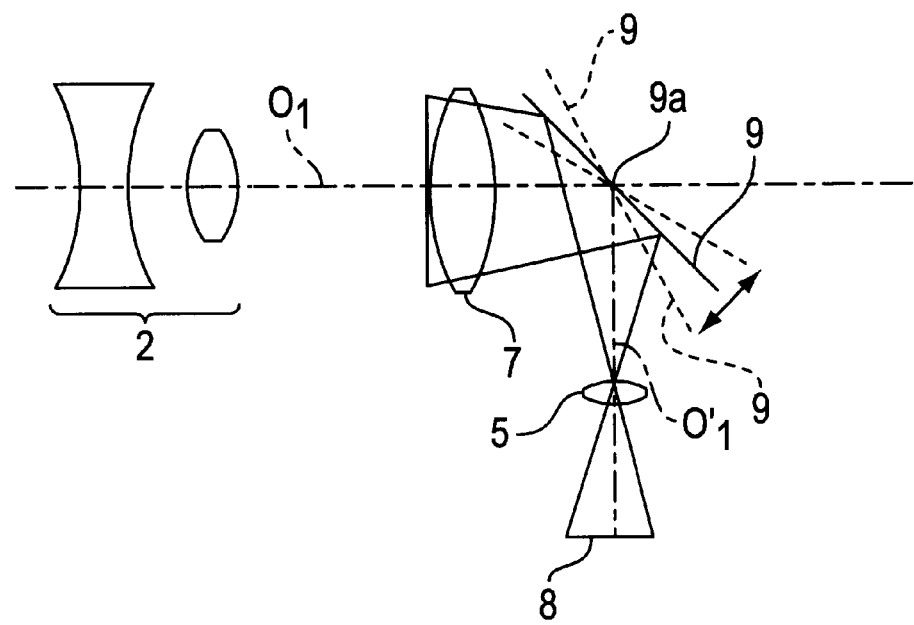

FIG. 6 shows another embodiment of the present invention in which a portion of the image formed by the first image forming lens 2 can be selected to be enlarged or reduced when the image is formed on the image pick-up surface 8. In this embodiment, a mirror 9 is provided between the condenser lens 7 and the image re-forming lens 5 to deflect the light path. The mirror 9 is rotatable or swingable about an axis 9a which is located on the optical axis O1 and is normal to the sheet on which the drawing (FIG. 6) is drawn. The optical axis O1' of the light reflected by the mirror 9 is offset from the optical axis of the image re-forming lens 5 in accordance with the angular displacement of the mirror 9.

In the arrangement shown in FIG. 6, the length of the optical path changes, particularly at the peripheral portion of the mirror 9, according to the angular position of the mirror 9. Therefore, to obtain a high quality image, it is preferable that the angular displacement of the mirror 9, i.e., the angle of deflection of the light by the mirror 9, be determined such that the change in the optical path length is within the depth of focus of the image re-forming lens 5.

As can be seen from the foregoing, if an optical element, such as the rotatable mirror 9, is used, the selection of the portion of the image to be enlarged or reduced can be effected by adjusting only the rotatable mirror 9. Thus, the adjustment of the image magnification can be carried out simply.

As may be understood from the above discussion, according to the present invention, since the image re-forming lens and the image pick-up surface are movable along the optical axis of the image re-forming lens, and the image pick-up surface is moved to an in-focus position in accordance with the position of the image re-forming lens, the focused image, having a size corresponding to the position of the image re-forming lens, is formed on the image pick-up surface. Thus, image magnification can be optically carried out.

Consequently, unlike the prior art in which the image is magnified by an electronic process, can a high resolution can be retained without the need for additional optical element (s) is necessary to adjust the image magnification. This results in a simplification and cost reduction of the optical system.

Moreover, according to the present invention, in a compound camera which is provided with an image forming surface, located at an in-focus position behind the first image forming lens, an image re-forming lens, and an image pick-up surface, located at the in-focus position of the image re-forming lens, the adjustment of the magnification of the image formed on the image pick-up surface has no influence on the image formed on the first image forming surface. Moreover, the whole optical system of the compound camera can be simplified.

Furthermore, since the image pick-up surface comprises of a CCD, it is easier to move the CCD than to move an image forming surface formed by a film or the like.

Moreover, according to the embodiment of the present invention, a selected portion of the image formed by the first image forming lens, other than the center portion, can be easily enlarged or reduced on the image forming surface by the image re-forming lens.

According to the embodiment of the present invention, since the selection of the portion of the image formed by the first image forming lens, to be enlarged or reduced, can be effected by the adjustment of only the deflecting element provided between the image re-forming lens and the image forming surface, the adjustment of the image magnification can be easily carried out by a simple structure.

Although the present invention has been described with reference to particular means, materials and embodiments, it is to be understood that the invention is not limited to the particulars disclosed and extends to all equivalents within the scope of the claims.

What is claimed is:

1. An apparatus for controlling the magnification of an image in a camera, said apparatus comprising:
    a first image forming lens which forms an image of an object;
    an image re-forming lens system, said image re-forming lens system having a fixed focal length, said image re-forming lens system re-forms said image formed by said first image forming lens on an image pickup surface; and
    a system that moves the entire said image re-forming lens system and said image pickup surface independently along an optical axis of said image re-forming lens said image re-forming lens system being arranged to maintain said fixed focal length at all positions of said image re-forming lens.

2. The image magnification controlling apparatus according to claim 1 wherein, said moving system moving said image pick-up surface to an in-focus position of said image re-forming lens system.

3. The image magnification controlling apparatus according to claim 1, wherein said camera is a compound camera, said compound camera comprising:
    an image forming surface located at an in-focus position of said first image forming lens;
    a light reflecting mechanism provided between said image forming surface and said first image forming lens, said image re-forming lens system being positioned in an optical path of light reflected by said light reflecting mechanism; and
    said image pick-up surface located at an in-focus position of said image re-forming lens system;
    wherein said image pick-up surface comprises a CCD.

4. The image magnification controlling apparatus according to claim 3, wherein said image forming surface comprises a silver halide film.

5. The image magnification controlling apparatus in a camera according to claim 1, wherein said image re-forming lens system and said image pick-up surface are capable of moving together in a direction perpendicular to said optical axis of said image re-forming lens system.

6. The image magnification controlling apparatus according to claim 1, further comprising an optical element provided between said image re-forming lens system and an image forming surface provided on a re-forming lens system side of said image pickup surface to deflect light at a variable deflection angle.

7. A method for controlling a magnification of an image in a camera comprising a first image forming lens having a fixed focal length and which forms an image of an object and an image re-forming lens system which re-forms said image formed by said image forming lens on an image pickup surface, said method comprising:
    moving the entire said image re-forming lens system in an optical axis direction; and
    moving said image pickup surface in said optical axis direction of said image re-forming lens system independently of movement of the entire image re-forming lens system, so that said image pickup surface is located in an in focus position at the fixed focal length of said image re-forming lens system at all positions of the image re-forming lens system.

8. The method according to claim 7, wherein said camera is a compound camera, said compound camera comprising an image forming surface located at an in focus position of said first image forming lens, a light reflecting surface provided between said image forming surface and said first image forming lens, said image re-forming lens system being positioned in an optical path of light reflected by said light reflecting surface, and an image pickup surface located at an in focus position of said image re-forming lens system; and
    wherein said image pickup surface comprises a CCD.

9. The method according to claim 8, wherein said is image forming surface comprises a silver halide film.

10. The method according to claim 7, further comprising a step of moving said image re-forming lens system and said image pick-up surface in a direction perpendicular to said optical axis of said image re-forming lens system.

11. The apparatus for controlling a magnification of an image in a camera according to claim 1, said moving system moving said re-forming image lens system along the optical axis to vary an object distance for image magnification, said moving system moving said image pickup surface to an in focus position, said object distance being defined as a distance between said image re-forming lens system and an element positioned at a position optically equivalent to an image forming surface of said first image forming lens with respect to said first image forming lens.

12. The method for controlling the magnification of an image in a camera according to claim 7, wherein the image re-forming lens system is moved for image magnification in an optical axis direction to vary an object distance between the image re-forming lens system and an optical surface positioned at a position optically equivalent to an image forming surface of the first image forming lens with respect to the first image forming lens, said image pickup surface is moved in the optical axis direction of the image forming lens system to an in focus position.

13. An apparatus for controlling the magnification of an image in a camera, said apparatus comprising:

a first image forming lens which forms an image of an object on an image forming surface;

an image re-forming lens system which re-forms said image formed by said first image forming lens on an image pickup surface, said image re-forming lens re-forming an image formed by said first image forming lens on an optical element positioned at a location optically equivalent to the image forming surface of said first image forming lens; and a moving system that moves said image re-forming lens system and said image pickup surface, said moving system moves said image re-forming lens system and said image pickup surface independently along an optical axis of said image re-forming lens system, said moving system moving said image re-forming lens system along the optical axis to vary image magnification, said moving system moving said image pickup surface for focusing.

14. The apparatus for controlling the magnification of an image according to claim 13, said image forming lens system comprising a fixed focal length lens system.

15. The apparatus for controlling the magnification of an image according to claim 14, said moving mechanism moving said image re-forming lens system for image magnification to maintain said fixed focal length at all positions of said image re-forming lens system, said moving mechanism moving said image pickup surface for focusing system for image magnification.

* * * * *